Patented Mar. 22, 1932

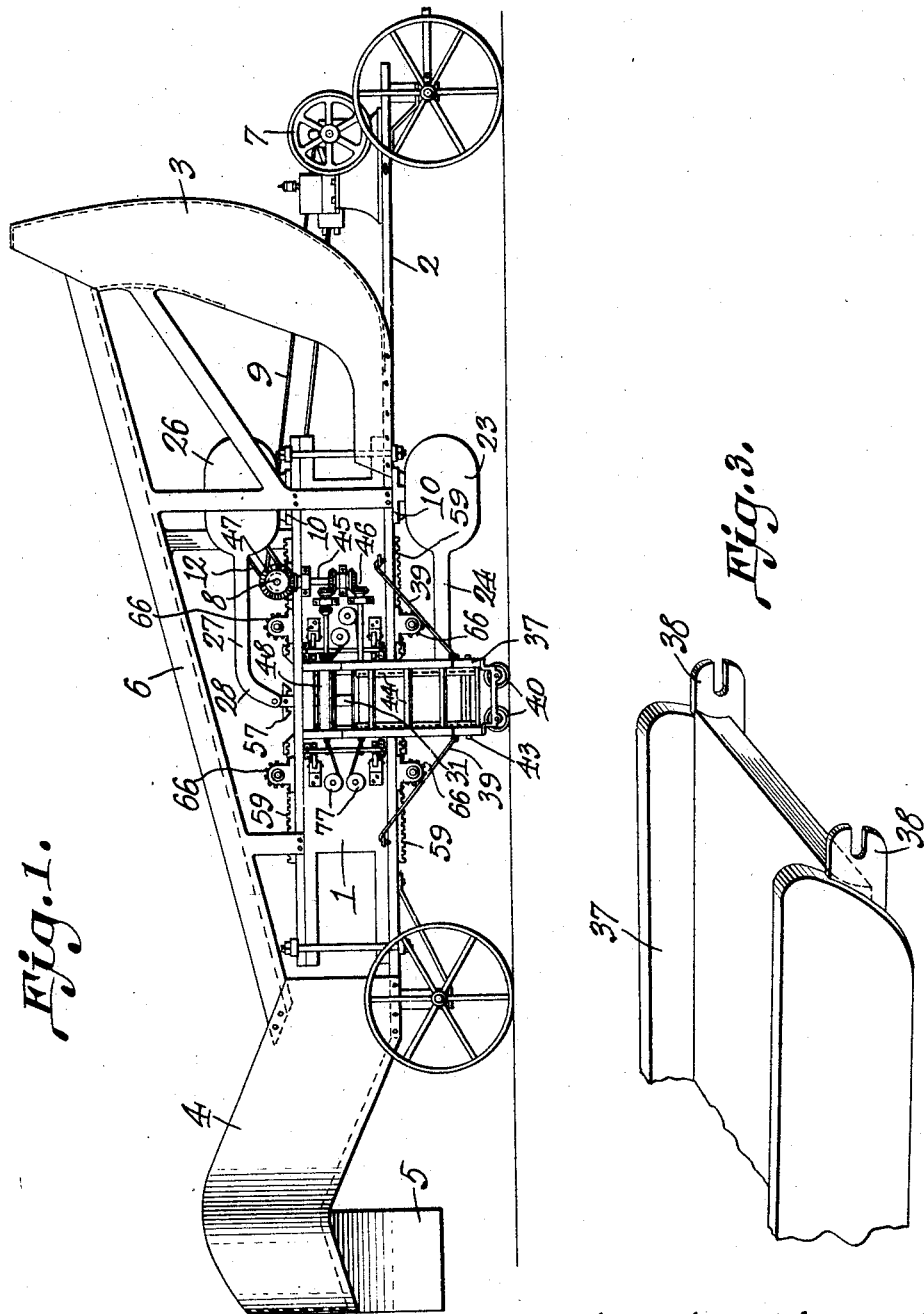

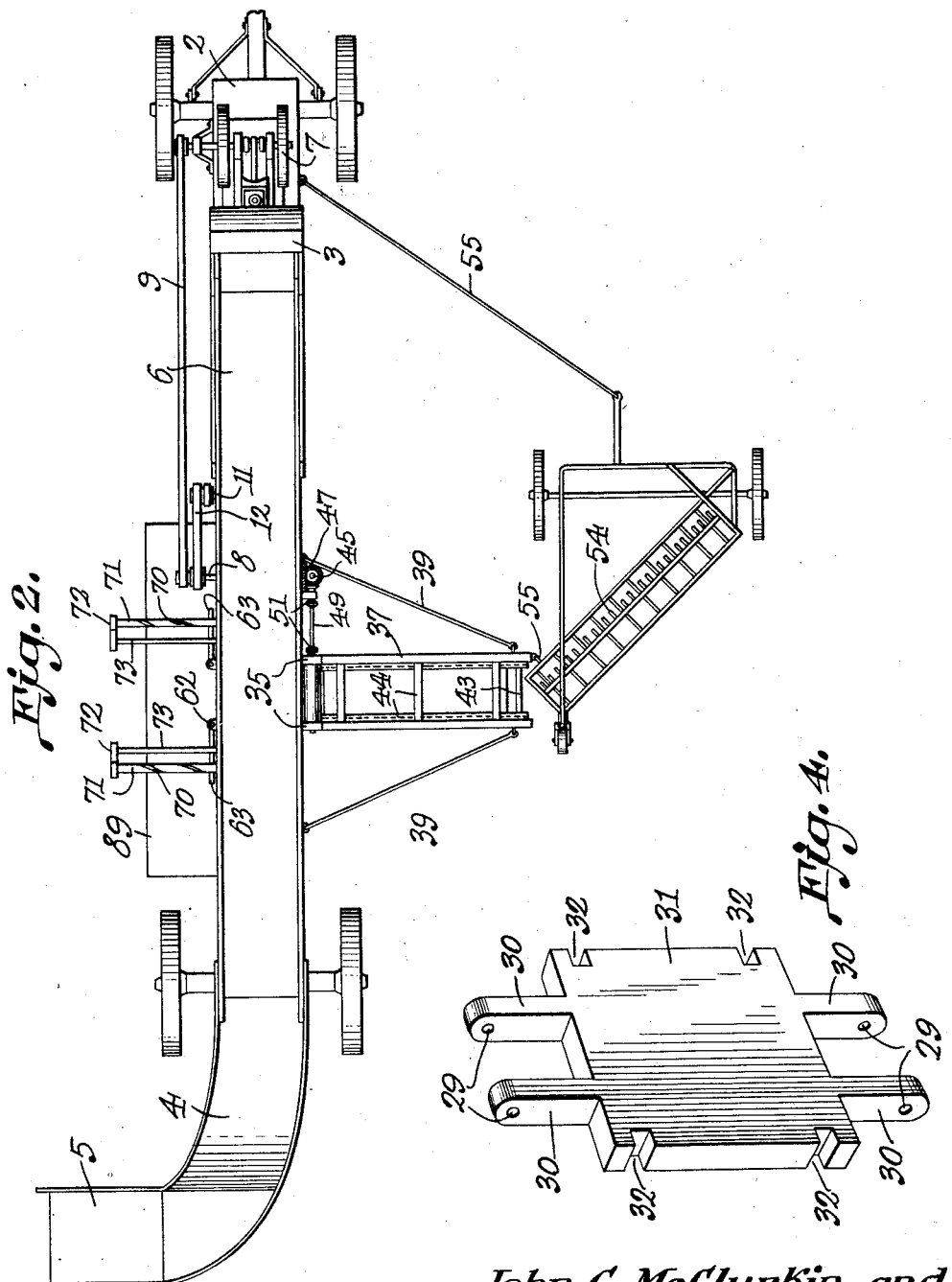

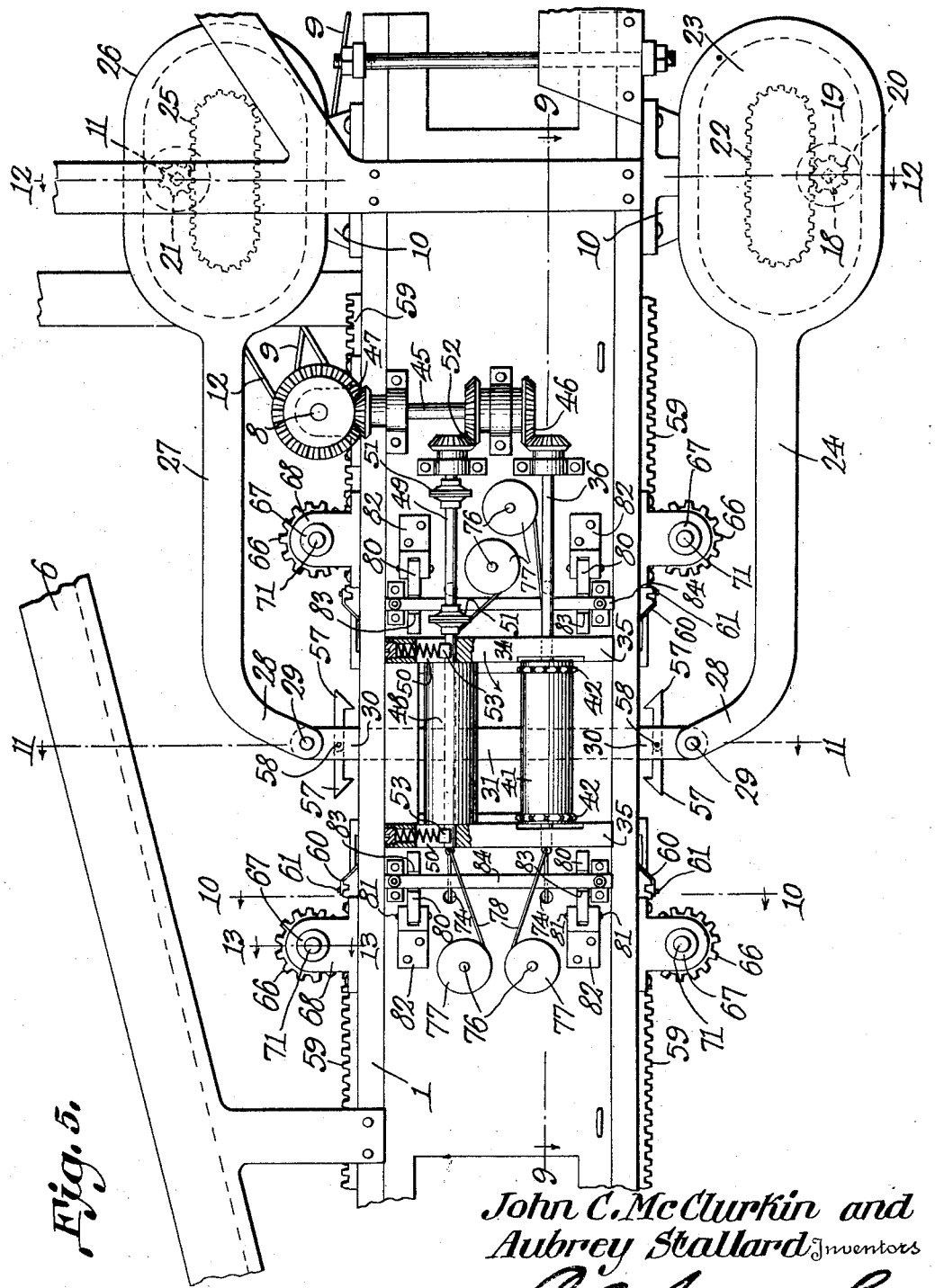

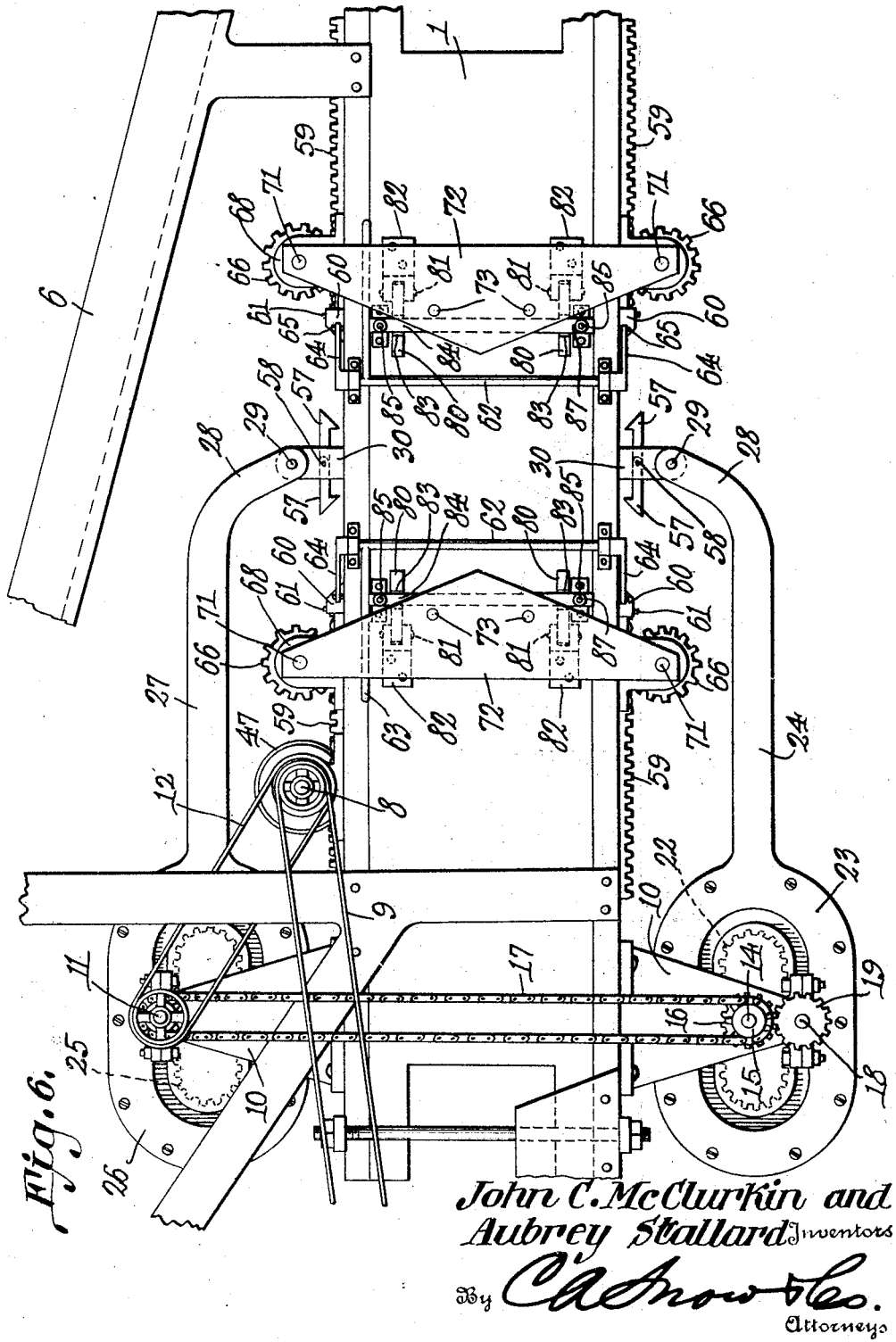

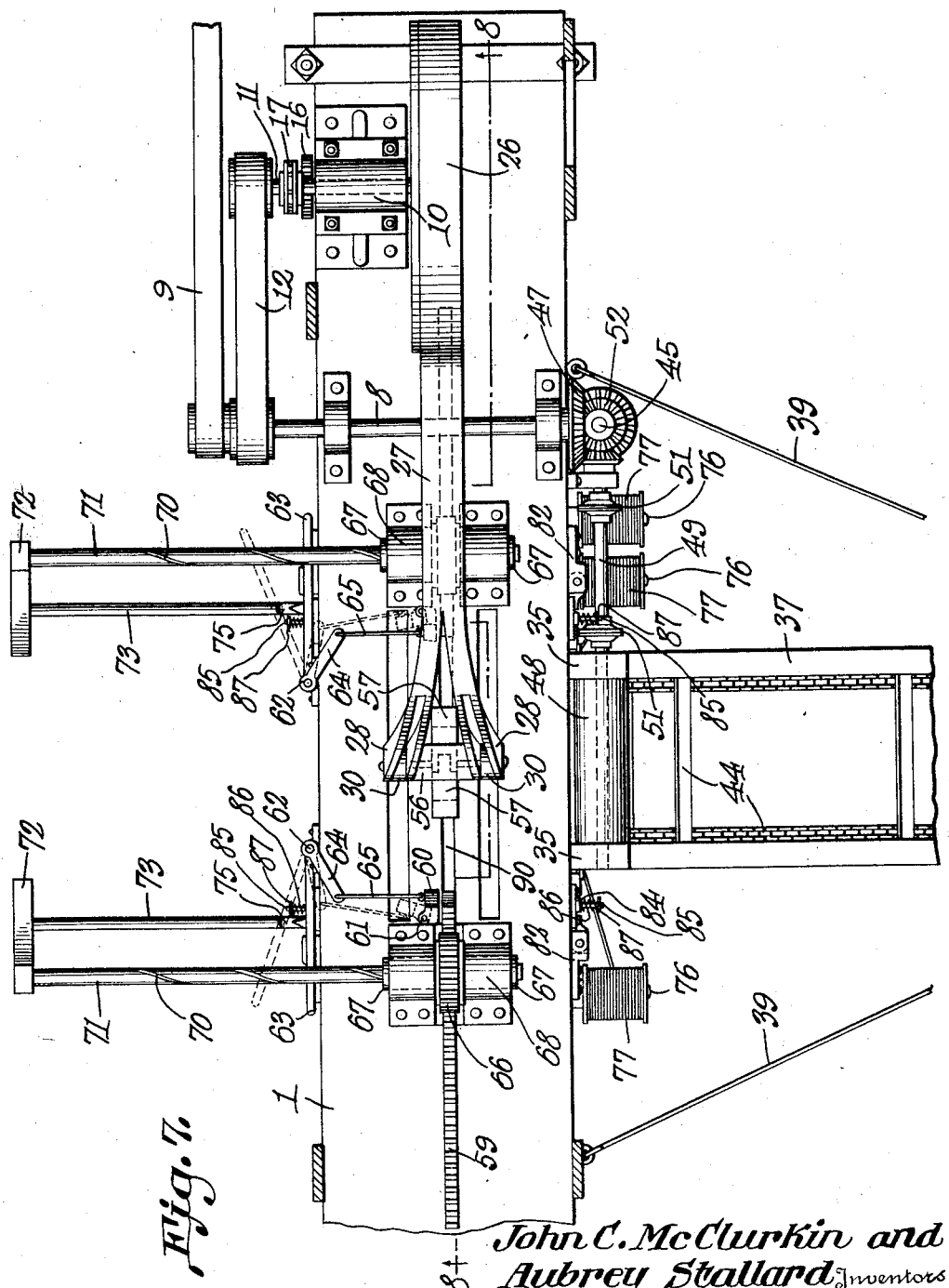

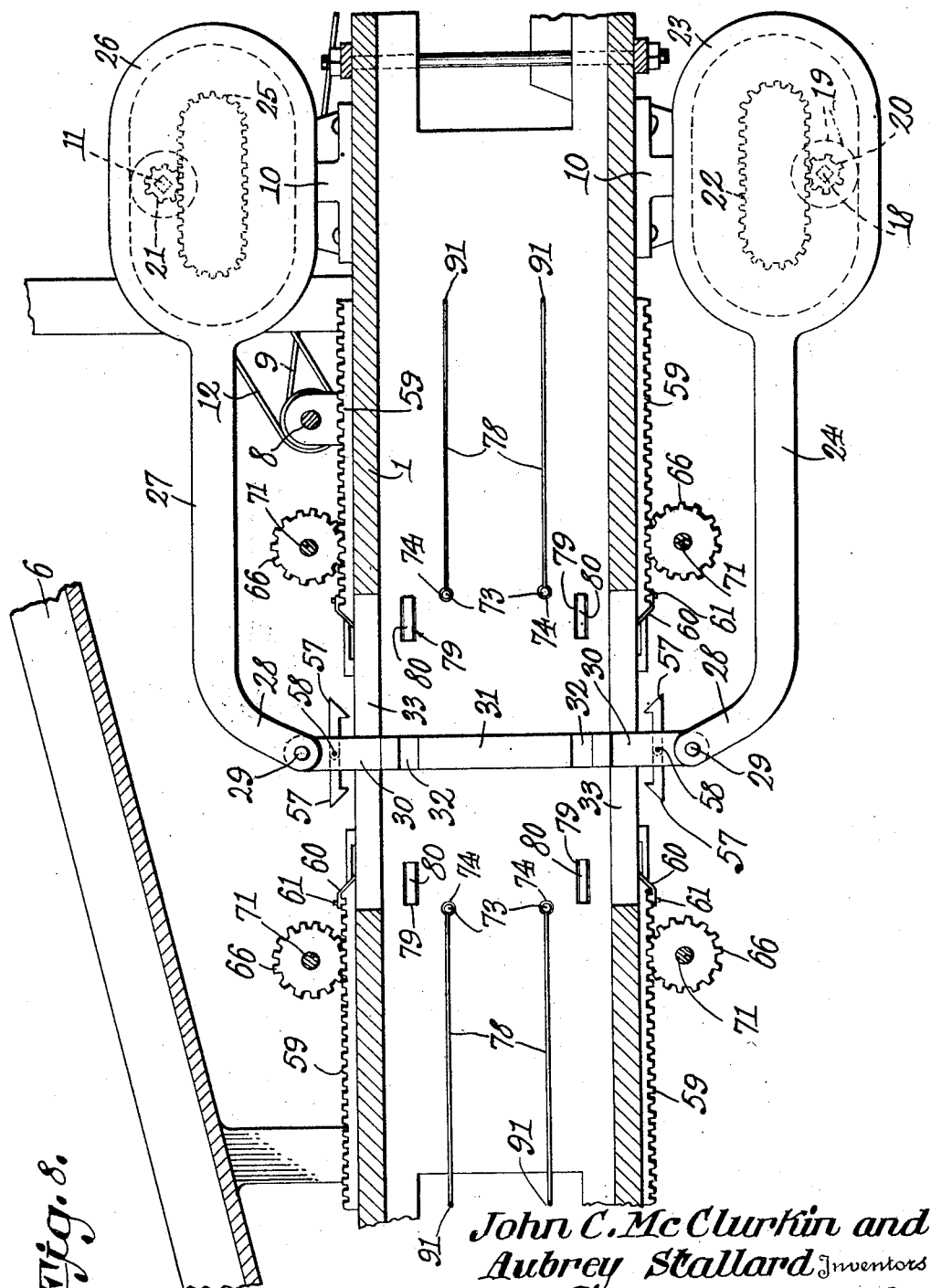

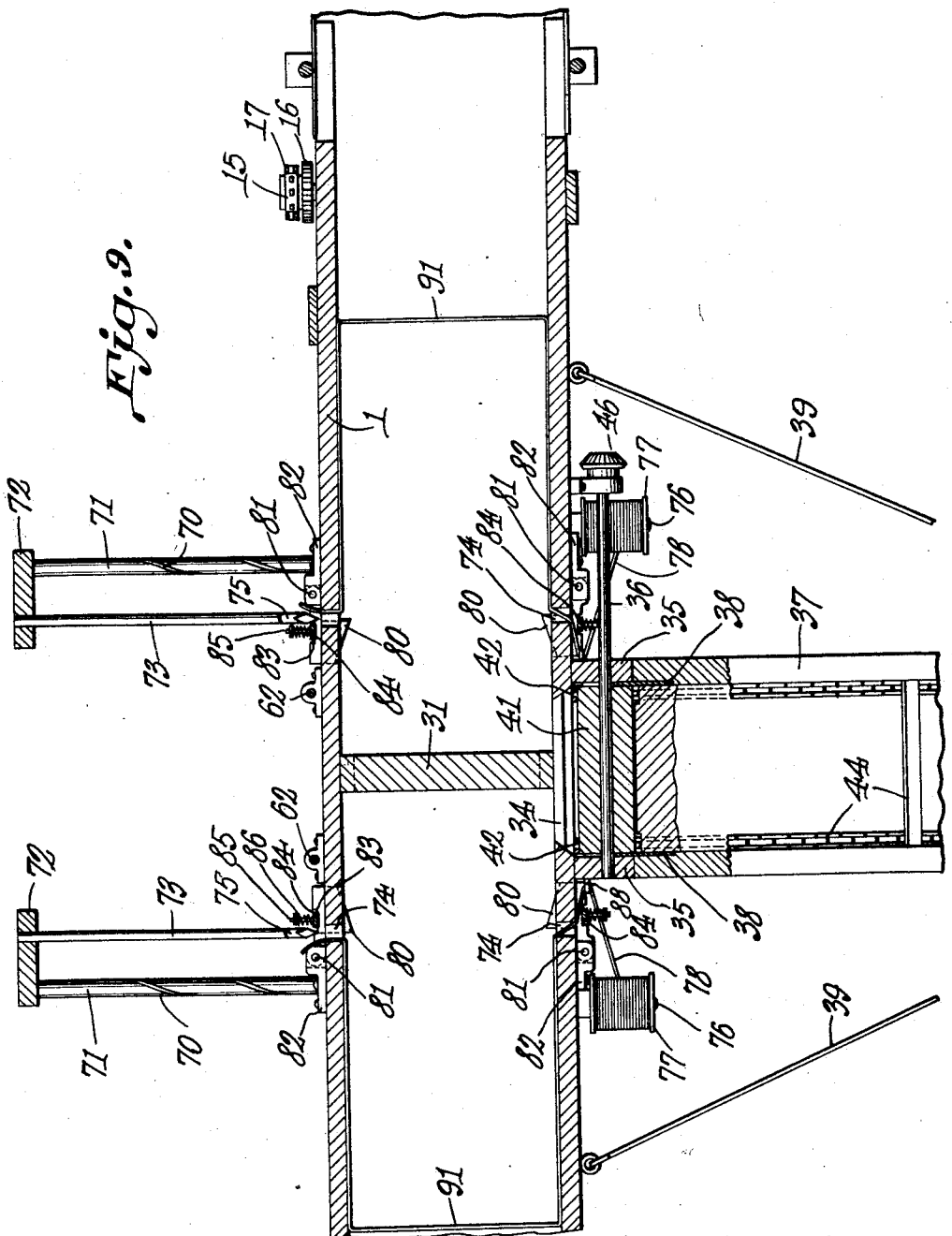

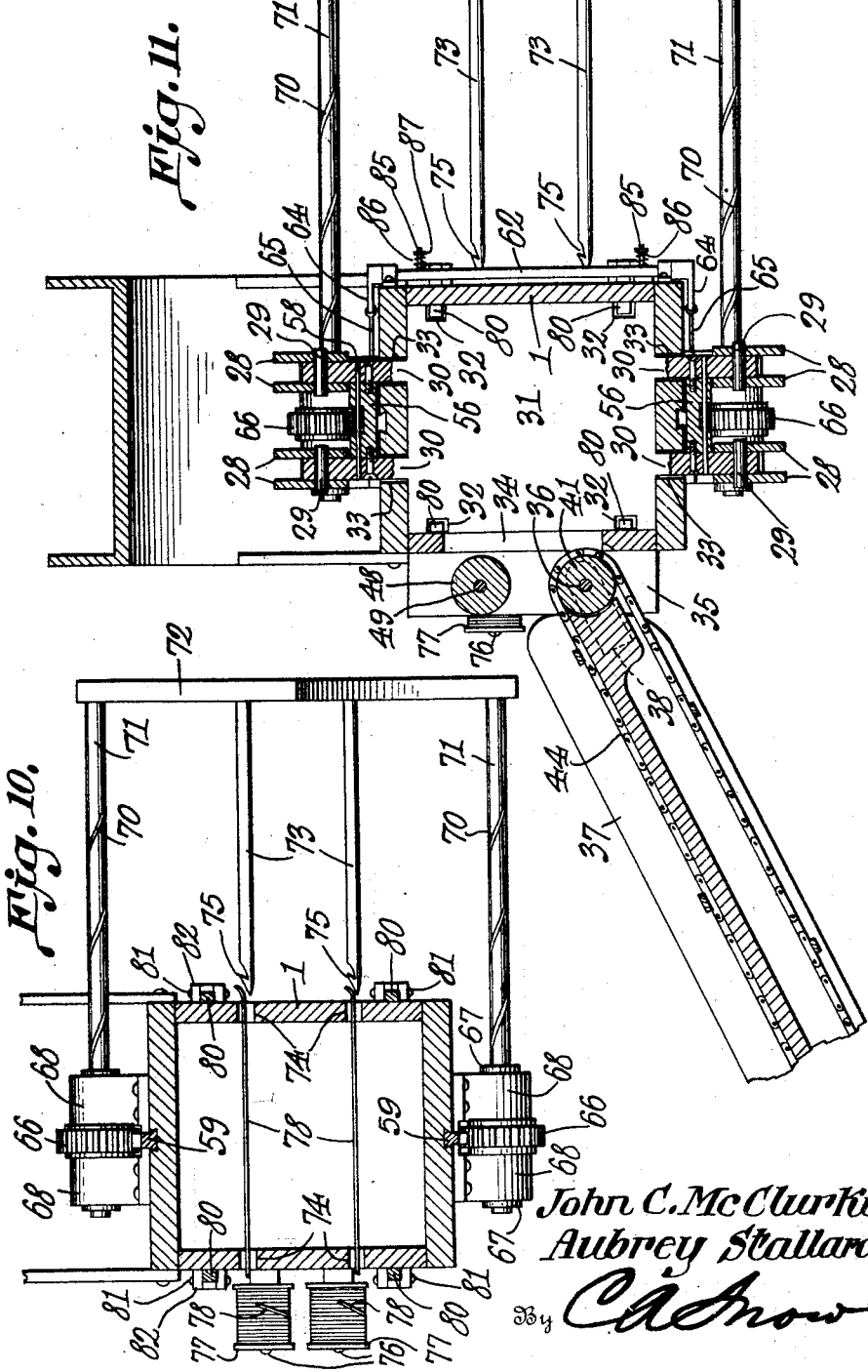

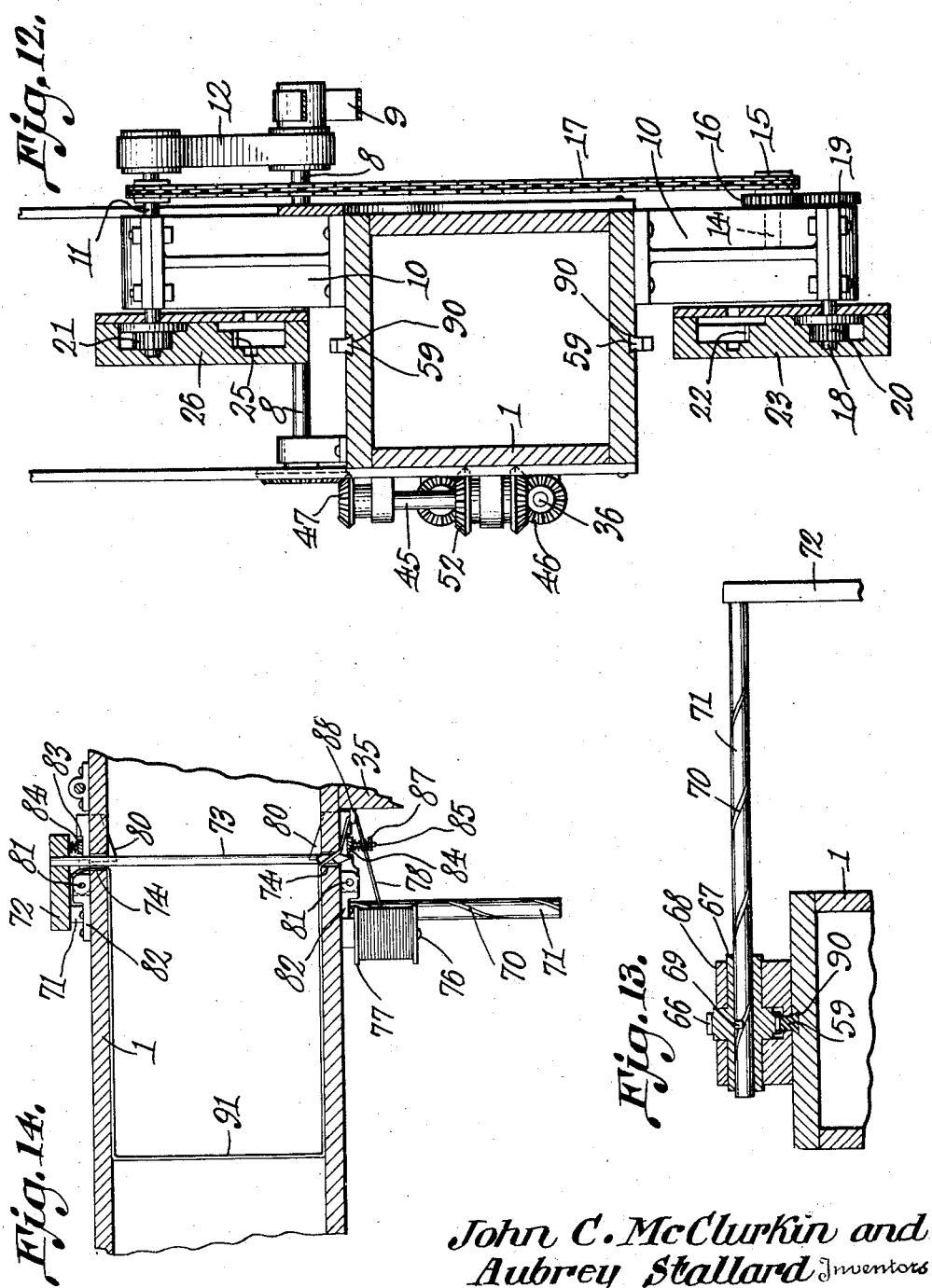

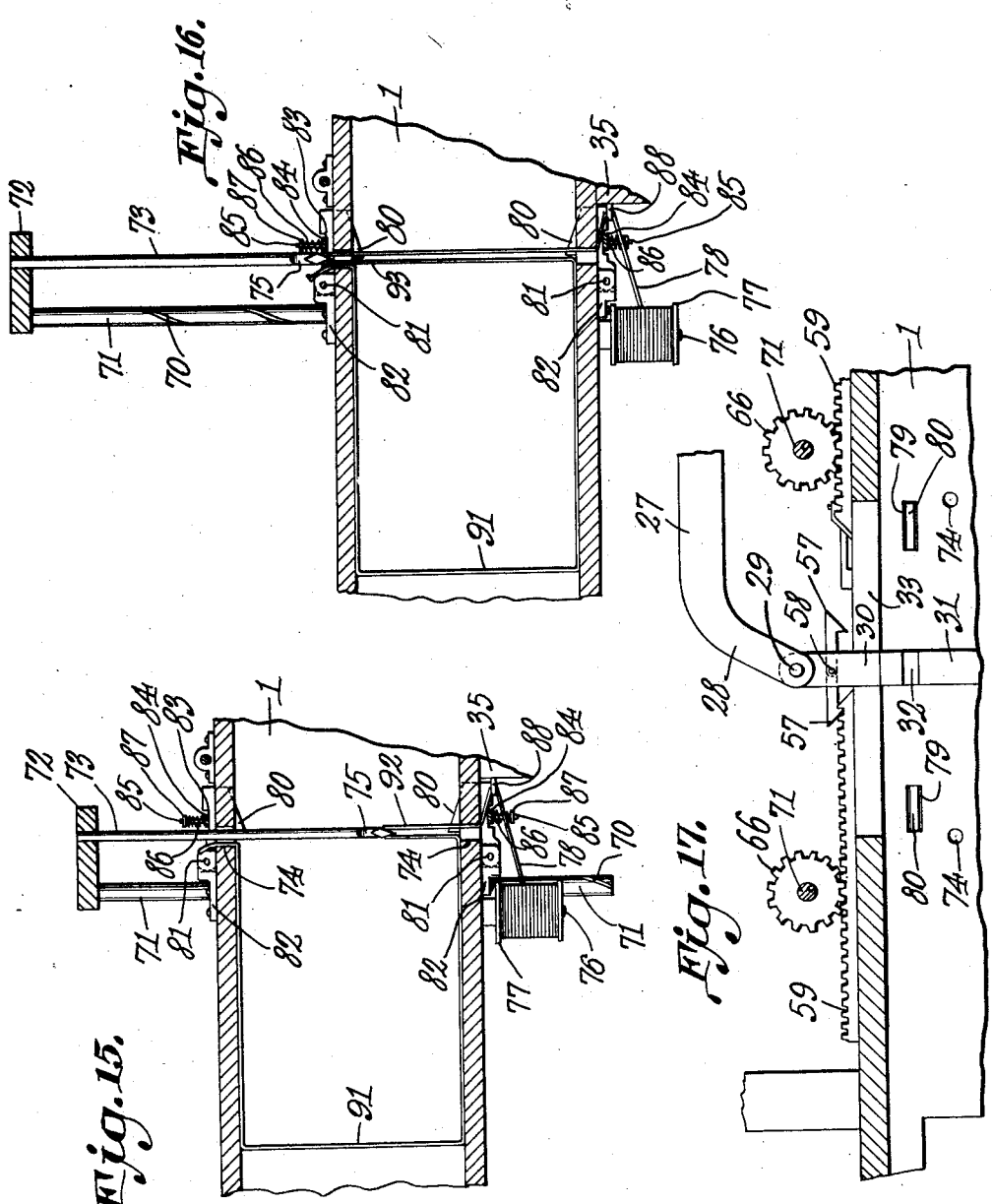

1,850,284

UNITED STATES PATENT OFFICE

JOHN C. McCLURKIN AND AUBREY STALLARD, OF LAKIN, KANSAS

HAY BALER

Application filed July 12, 1928. Serial No. 292,049.

The device forming the subject matter of this application is a hay baler and one object of the invention is to supply a hay baler in which the ram operates to compress the hay when the ram moves in either direction, the capacity of the machine, therefore, being doubled with respect to machines in which the hay or other material is compressed when the ram moves in one direction only. Another object of the invention is to provide novel means for delivering the baled hay or other material at a single point. A further object of the invention is to provide a device of the class described which will gather and bale hay in the field, from the swath or windrow.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in side elevation, a device constructed in accordance with the invention;

Figure 2 is a top plan of the complete machine;

Figure 3 is a perspective view showing one end of the conveyor frame;

Figure 4 is a perspective view of the ram;

Figure 5 is a side elevation on an enlarged scale, parts being omitted;

Figure 6 is an elevation on an enlarged scale, showing the opposite side of the machine from that which is depicted in Figure 5, parts being omitted;

Figure 7 is a top plan, parts being omitted;

Figure 8 is a section on the line 8—8 of Figure 7;

Figure 9 is a section on the line 9—9 of Figure 5;

Figure 10 is a section on the line 10—10 of Figure 5;

Figure 11 is a section on the line 11—11 of Figure 5;

Figure 12 is a section on the line 12—12 of Figure 5;

Figure 13 is a sectional view illustrating the mechanism for operating the needles;

Figure 14 is a horizontal sectional view showing one step in the operation of the needles;

Figure 15 is a sectional view showing an intermediate step in the operation of the needles;

Figure 16 is a sectional view showing the needle as it will appear after it has drawn the binder through the bale;

Figure 17 is a longitudinal sectional view of a part of the mechansm for operating the needles.

The support on which the machine is mounted, may be of any desired sort, but the device embodies a trunk 1 at one side of which there is a platform 89 (Figure 2) on which the operators may stand. The base 2 of the trunk 1 forms part of a wheel-mounted truck, as shown, for instance, in Figure 1 of the drawings. At one end of the trunk 1 there is an upwardly extended chute 3. At the opposite end of the trunk 1 there is an upwardly extended chute 4 having a laterally extended and downwardly prolonged outlet 5. An inclined track 6 is supported from the frame work of the machine, the higher end of the track 6 being at the upper end of the chute 3, and the lower end of the track 6 being in communication with the chute 4, at a point near to the inner end of the chute 4, as disclosed in Figure 1 of the drawings.

An engine 7 is mounted on the truck near to the chute 3 (or elsewhere). A transverse shaft 8 is supported for rotation on the top of the trunk 1. There is a belt and pulley connection 9 between the shaft of the engine 7 and the shaft 8. Figures 6 and 12 show that bearings 10, in the form of standards, are mounted on the top and on the bottom of the trunk 1. In the upper bearing 10, a horizontal shaft 11 is journaled for rotation.

The shaft 11 is operatively connected with the shaft 8 by a belt and pulley mechanism 12. A stub shaft 14 is mounted in the lower bearing standard 10. A sprocket wheel 15 and a gear wheel 16 are mounted to turn together on the stub shaft 14. There is a sprocket chain connection 17 between the shaft 11 and the sprocket wheel 15. A lower shaft 18 is journaled in the lower bearing standard 10. There is a gear 19 on the shaft 18, and the gear 19 meshes with the gear 16 which is operated by the sprocket wheel 15 and the sprocket chain 17. On the inner end of the shaft 18 there is a pinion 20. A pinion 21 is mounted on the inner end of the shaft 11 which is located at the top of the machine.

The pinion 20 cooperates with a hooded loop shaped gear track 22 located in an enlarged head 23 on one end of a pitman 24 which operates below the trunk 1 as shown, for instance, in Figure 6. The pinion 21 cooperates with a hooded loop shaped gear rack 25 located in a head 26 on one end of a pitman 27 which is disposed above the trunk 1.

The pitmen 24 and 27 have forks 28 (Figure 7) which are extended (Figure 8) toward the axis of the trunk 1. The forks 28 are pivoted at 29 (Figures 6 and 11) to fingers 30 (Figure 4) on a ram 31 which is mounted to reciprocate horizontally in the trunk 1, in the direction of the length of the trunk. The ram 31 has notches 32 in its vertical edges, for a purpose which will be described hereinafter.

The trunk 1 is provided in its top and in its bottom (Figures 7 and 8) with elongated slots 33 in which the fingers 30 of the ram 31 move, when the ram is reciprocated during the baling operation.

In one side of the trunk 1 there is an opening 34 (Figures 9, 5 and 11) through which the hay is fed into the path of the ram 31. As shown in Figure 1, the ram is so mounted that it can work back and forth across the opening 34, and consequently, the hay is fed in on each side of the ram, so that no matter which way the ram is moved, it is compressing the hay into bales.

Outstanding bearing brackets 35 (Figures 9 and 5) are mounted on the trunk 1 or on opposite sides of the opening 34. A horizontal lower shaft 36 is journaled in the bearing brackets 35 and is supported also on the trunk 1, as Figure 5 will show. The numeral 37 marks a conveyer frame which can be seen applied in Figures 1 and 2. Figure 11 shows, on a large scale, that the conveyor frame 37 has a downward slope and Figure 3 brings out the fact that at the upper end of the conveyor frame 37 there are notched projections 38 which, as indicated in Figures 9 and 11, receive the shaft 36, thereby to form a mounting for the upper end of the conveyor frame 37.

The conveyor frame 37 is held against swinging cross wise by means of braces 39 connected detachably at their upper ends to the trunk 1, as seen in Figure 1. On the lower end of the conveyor frame 37 there are ground wheels 40 which support the lower or outer end of the conveyor frame when the vehicle is advanced.

Considering Figure 9 in connection with Figure 5, one may note that a feed roll 41 is secured to the shaft 36, the feed roll being located between the bearing brackets 35. On the ends of the feed roll 41 there are sprocket wheels 42. It appears in Figures 1 and 2 that a shaft 43 is journaled in the lower end of the conveyor frame 37. The conveyor frame 37 is traversed by an endless conveyor 44, the sprocket chains of which cooperate with the shaft 43 and with the sprocket wheels 42 on the feed roll 41. Figure 11 makes it clear that the purpose of the conveyor 44 is to carry the hay upwardly through the opening 34 and into the trunk 1. A vertical shaft 45 (Figure 5) is supported for rotation on the trunk 1 and is connected at its lower end by bevelled gears 46, with the shaft 36. Bevelled gears 47 connect the upper end of a shaft 45 with the transverse shaft 8 which is shown in Figure 7, it being recalled that the shaft 8 gets a drive from the engine 7 by way of the belt 9.

An upper feed roller 48 is disposed above the lower feed roller 41 and cooperates with that roller in carrying the hay into the trunk 1 as the hay leaves the upper end of the conveyor 44 (Figure 11). The feed roller 48 is carried by a shaft 49 supported for rotation in the brackets 35 and on the side of the trunk 1. The brackets 35 have elongated slots or guides 50 for the reception of the shaft 49, so that the shaft, with the feed roll 48, can move up and down a little and thereby prevent the hay from jamming and clogging if the hay happens to be fed along by the conveyor 44 a little faster than usual. The shaft 49 is held down by spring-pressed bearings 53, which can be seen in Figure 5, and there are universal joints 51 in the shaft 49, to the end that the roller 48 may have some up and down movement, as and for the purpose hereinbefore explained. Bevelled gears 52 form an operative connection between the shaft 49 and the shaft 45. A rake 54, of any desired construction is connected at 55 with the outer end of the conveyor frame 37 and with the truck, as shown in Figure 2. The rake collects the hay and passes it inwardly so that the hay can be picked up by the conveyor 44 which moves upon the conveyor frame 37.

The machine embodies two component mechanisms, to wit, the bale or pressing mechanism, and the mechanism whereby the wires are engaged about the bale. The baling or pressing mechanism has been described, and at this point, the operation of the baling mechanism will be set forth.

From the engine 7, motion is transmitted by the belt and pulley connection 9 to the transverse shaft 8. From the shaft 8, motion is transmitted to the shaft 11 by way of the belt and pulley connection 12. The reversing gear 16 of Figure 12 is driven from the shaft 11 by the chain and sprocket connection 17—15. The gear 16 drives the gear 19 and the gear 19 rotates the shaft 18. The shaft 18 rotates the pinion 20, and the pinion 21 is rotated directly by the shaft 11.

Noting Figure 5, for instance, the pinion 21 cooperates with the loop shaped track 25 and the pinion 20 cooperates with the loop shaped track 22. By this means, the pitmen 24 and 27 are caused to reciprocate and the pitmen impart reciprocation to the ram 31 the ram moving to and fro, across the opening 34 through which the hay enters the trunk 1. The hay, compressed by the ram 31, and wired up into bales by a mechanism hereinafter described, is carried in opposite directions by the ram 31, the ram effecting a baling of the hay, no matter whether the ram be moved to the left or to the right.

Thus, the capacity of the machine is doubled, as compared with the capacity of a machine in which the ram compresses when the ram moves in one direction only. Referring to Figure 1, the bales of hay which are crowded to the right, are thrust upwardly in the chute 3 and slide downwardly along the track 6 into the chute 4. The bales which are thrust to the left in Figure 1 pass directly into the chute 4, the entire output leaving by way of the outlet 5.

The shaft 8 of Figure 7 drives the shaft 45 of Figure 5 by way of the bevelled gears 47. The bevelled gears 52 impart rotation to the shaft 49, and the bevelled gears 46 impart rotation to the shaft 36, the shaft 45, therefore, being a driving means for both of the shafts 36 and 49. The shaft 49 turns the upper feed roller 48, and the shaft 36 turns the lower feed roller 41. These rollers, cooperating in a way which will be understood when Figure 11 is examined, pass the hay into the trunk 1, on opposite sides of the ram 31, through the opening 34, when the hay arrives at the upper end of the conveyor frame 37. The hay may be collected by the rake 54 of Figure 2 and be deposited in the lower end of the conveyor 44, and the conveyor 44 carries up the hay to the feed rolls 48 and 41, the conveyor being actuated by the sprocket wheels 42 (Figures 5 and 11) at the ends of the lower feed roll 41.

Up to this point, it has been explained how the hay is collected, carried upwardly into the trunk, compressed in opposite directions by the ram, and delivered through a single outlet; and it remains to describe the mechanism whereby the wires are engaged around the bales, and to point out how that mechanism operates.

Abutment blocks 56 (Figures 11 and 7) are secured between the fingers 30 of the ram 31 and move in close relation to the top and to the bottom of the baling trunk 1. Bevelled latches 57 are pivotally mounted at 58 on the abutment blocks 56. The latches 57 are adapted to engage with the bevelled ends of rack bars 59. Referring to Figure 5, the left hand latch 57, for instance, will engage automatically with the right hand end of the left hand rack bar 59 and pull the left hand rack bar to the right, when the ram 31 moves to the right. When, however, the ram 31 moves to the left, then the block 56 of Figure 7 engages the right hand end of the left hand rack bar 59 and moves that bar to the left. The machine, therefore, embodies a means whereby reciprocation is imparted to the rack bars 59 from the ram 31. It takes several bats of hay to make up a bale and the ram 31 may be permitted to make any desired number of reciprocations before the wire operating mechanism is put into operation.

In order that this may be accomplished, some means must be provided so that the latches 57 will not hook into the rack bars 59 each time that the ram 31 is reciprocated.

To this end, bevelled releasers 60 (Figures 6 and 7) are pivotally mounted at 61 for horizontal swinging movement on the trunk 1. If the releasers 60 are in the position shown in solid line in Figure 6, then the latches 57 will slide up on the releasers, and will not hook into the rack bars 59 when the ram 31 is reciprocated. If, however, the releasers 60 are pulled around into the dotted line position of Figure 7, then the latches 57 will engage with the rack bars 59 and operate the rack bars, when the ram 31 is reciprocated. For the operation of the releasers, links 65 are provided and are pivoted at their inner ends to the releasers. The outer ends of the links 65 are pivoted to arms 64 (Figures 7 and 6) on vertical shafts 62 journaled on the trunk 1, the shafts 62 being operated by means of handles 63 which can be reached by persons standing on the platform 89 of Figure 2. The rack bars 59 slide in dove-tailed grooves 90 (Figure 12) formed in the top and in the bottom of the trunk 1.

The rack bars 59 mesh with pinions 66 (Figures 11, 10 and 5), the pinions 66 having tubular hubs 67 (Figure 13) journaled in bearings 68 on the trunk 1. The hubs 67 of the pinions 66 are provided with internal projections 69 adapted to cooperate with spiral tracks 70 formed in operating members 71, the members 71 being rigid bars connected at their outer ends by yokes 72, as disclosed in Figures 10 and 11.

Needles 73 project inwardly from the yokebars 72 and are disposed between the operating members 71 in parallel relation thereto.

The needles 73 are supplied with pointed hooks 75, and the needles are adapted to move through openings 74 formed in the opposite side walls of the trunk 1.

Spindles 76 project outwardly from one side wall of the trunk 1, and on the spindles 76 are journaled the spools 77 which carry the baling wire 78, the wire being guided wherever necessary by eyes 88, so that the wire 78 may be held in proper relation to the openings 74, thereby to enable the hooks 75 of the needles 73 to engage the wire and pull it through the trunk 1, crosswise of the trunk, as shown in Figures 15 and 16. The trunk 1 has slots 79 through which operate dogs 80.

The dogs 80 extend inside of the trunk 1 as shown in Figure 9 and they act as retainers for the compressed bats of hay, when the ram 31 moves back, after compressing the material. It is to accommodate the dogs 80 that the ram 31 of Figure 4 is provided with the notches 32. The dogs 80 are pivotally mounted at 81 (Figures 5 and 15) on brackets 82 secured to the trunk 1. The dogs 80 are supplied in their outer edges with notches 83 receiving pressure bars 84. The pressure bars 84 slide on pins 85 mounted in the sides of the trunk 1. Compression springs 86 surround the pins 85, the inner ends of the springs engaging the pressure bars 84, and the outer ends of the springs engaging retainers 87 on the pins 85. The function of the springs 86 and the pressure bars 84 is to hold the dogs 80 yieldably in the position shown in Figure 9 of the drawings.

When the operator gets ready to draw the wire through the trunk 1, he operates the shaft 62 (Figure 6) by means of the handle 63, and the arms 64 on the shaft, together with the links 65 (Figure 7) pull the releasers 60 around into the dotted line position of Figure 7. This enables the latch 57 to engage with the rack bar 59. The rack bar is pulled in one direction by the latch 57, and is pushed in an opposite direction by the abutment block 56 on the ram 31.

Reciprocation, therefore, is imparted to the rack bar 59 from the ram. The operator can stop the reciprocation of the rack bar 59 at any time by bringing the releaser 60 back into the solid line position of Figure 7.

When the rack bar 59 is reciprocated, the rack bar rotates the pinion 66 (Figures 8 and 13), and the internal projections 69 on the pinions 66, cooperating with the tracks 70 on the slide bars 71, move the bars 72 (Figure 11) and the needles 73, in and out. The needles 73 first move in from the position of Figure 11, through the holes 74 in the baling trunk and pull the wires 78 across the trunk, as shown in Figure 10. The free ends of the wires 78 can be held by the operators, or retained in any suitable way. As the ram 31 forces the hay along in the trunk 1, the wire 78 is pulled off the spools 77 and is formed into a loop which is marked by the numeral 91 in Figure 15. When enough hay has been compacted, the operator puts the needles into operation again and they move through the trunk 1, the wires being caught, each, in a loop 92 on the needles 73. The loop 92 is pulled entirely through the trunk, as shown at 93 in Figure 16. The operator stops the movement of the needles, cuts off the wire, twists the ends of it around the bale, and the baling operation proceeds.

Having thus described the invention, what is claimed is:

1. In a device of the class described, a trunk, a ram mounted to reciprocate in the trunk, means for operating the ram, a needle movable in the trunk transversely of the line of reciprocation of the ram, a slide connected to the needle, a rotary member supported on the trunk, means for imparting reciprocation to the slide from the rotary member, mechanism for operating the rotary member from the ram, said mechanism including a latch, and means for moving the latch into inoperative position whereby the ram may operate independently of the rotary member.

2. In a device of the class described, a trunk, a ram mounted to reciprocate in the trunk, means for operating the ram, a needle movable in the trunk transversely of the line of reciprocation of the ram, a slide connected to the needle, a pinion through which the slide reciprocates, means for supporting the pinion for rotation, means for imparting right line movement to the slide when the pinion is rotated, a slidably supported rack bar meshing with the pinion, and a releasable connection between the rack bar and the ram.

3. In a device of the class described, a trunk, a ram mounted for right-line reciprocation in the trunk, means for operating the ram, rotary driving members supported for rotation on the trunk, mechanism for operating the rotary driving members from the ram at the will of an operator, slides mounted to reciprocate in the driving members, means for imparting right-line movement to the slides from the driving members, a yoke connecting the slides and a needle carried by the yoke and movable in the trunk transversely of the line of reciprocation of the ram.

4. In a device of the class described, a trunk, a ram mounted for right-line movement in the trunk, means for operating the ram, a needle slidably mounted in the trunk for movement transversely of the path of movement of the ram, mechanism for actuating the needle, said mechanism embodying a rack slidable on the trunk, and a pinion supported for rotation in a vertical plane on the trunk and meshing with the rack, a dog pivoted to the ram for vertical swinging movement and engageable with the rack when the ram is reciprocated, a releaser pivotally mounted on the trunk for horizontal movement and located at a point spaced from the sides of the trunk, and means under the control of an operator and extended outwardly beyond one side of the trunk for moving the releaser into the path of the dog, to prevent the dog from engaging with the rack when the ram is reciprocated.

5. In a device of the class described, a trunk, a ram mounted for right-line movement in the trunk, means for operating the ram, needles slidably mounted in the trunk for movement transversely of the path of movement of the ram, mechanisms for actuating the needles, said mechanisms embodying racks slidable longitudinally of the trunk, and pinions supported for rotation in vertical planes on the trunk and meshing with the racks, dogs pivoted to the ram for vertical movement and engageable with the racks when the ram is reciprocated, releasers movably mounted on the top and on the bottom of the trunk for horizontal movement and spaced from the sides of the trunk, a substantially vertical shaft journaled on one side of the trunk, a handle carried by the shaft, arms on the shaft, and links connecting the arms with the releasers, the shaft and the aforesaid parts which are associated therewith constituting means under the control of an operator for moving the releasers into the path of the dogs, to prevent the dogs from engaging with the racks when the ram is reciprocated.

In testimony that we claim the foregoing as our own, we have hereto affixed our signatures.

JOHN C. McCLURKIN.
AUBREY STALLARD.